United States Patent [19]

Lamle

[11] Patent Number: 5,097,646
[45] Date of Patent: Mar. 24, 1992

[54] COMPOUND BUILDING MEMBER

[76] Inventor: Stewart Lamle, 3 Fordham Hill Oval, Apt. 15F, Bronx, N.Y. 10468

[21] Appl. No.: 642,044

[22] Filed: Jan. 16, 1991

[51] Int. Cl.$^5$ .................. B04H 12/00; B04H 12/10; E04C 3/30
[52] U.S. Cl. ...................................... 52/648; 52/653; 52/734; 52/736
[58] Field of Search ................ 52/646, 648, 653, 722, 52/727, 734, 736

[56] References Cited

U.S. PATENT DOCUMENTS

| | | | |
|---|---|---|---|
| 373,177 | 11/1888 | Einbigler et al. | 52/180 |
| 388,108 | 8/1888 | Bataille | 52/180 |
| 762,280 | 8/1904 | O'Shea | 52/250 |
| 821,725 | 5/1906 | Moltrup | 52/653 |
| 887,863 | 5/1908 | Spaulding et al. | 52/648 |
| 918,678 | 3/1909 | Keenan et al. | 285/285 |
| 1,008,209 | 11/1911 | Skinner | 52/653 |
| 1,332,387 | 3/1920 | Easterday | 138/175 |
| 1,485,562 | 3/1924 | Lumley | 52/737 |
| 1,617,262 | 2/1927 | Malone | 52/653 |
| 1,637,259 | 7/1927 | Malone | 52/653 |
| 1,975,281 | 10/1934 | Lumb | 404/134 |
| 1,994,930 | 3/1935 | Tommerup | 404/134 |
| 2,078,485 | 4/1937 | Dunham | 404/31 |
| 2,115,667 | 4/1938 | Ellis | 404/70 |
| 2,139,816 | 12/1938 | Fordyce | 404/70 |
| 2,870,793 | 1/1959 | Bailey | 52/727 |
| 3,084,481 | 4/1963 | Silberkuhl et al. | 52/224 |
| 3,436,890 | 4/1969 | Dismukes | 52/660 |
| 3,916,592 | 11/1975 | Morohashi et al. | 52/252 |
| 4,309,124 | 1/1982 | Bertels | 404/70 |
| 4,704,754 | 11/1991 | Bonasso | 14/20 |

FOREIGN PATENT DOCUMENTS

272633 6/1927 United Kingdom .................. 52/653

Primary Examiner—James L. Ridgill, Jr.
Attorney, Agent, or Firm—Paul C. Scifo

[57] ABSTRACT

A compound building member for use in fabricating structures. The member in a first form includes a plurality of elements having a rotationally asymmetric closed plane cross section, the rotational asymmetric elements are helically wound in complementary fashion and intertwined to form a cylindrical lattice body that extends in the members longitudinal direction. In addition, the rotationally asymmetrical elements are twisted about their longitudinal axis to form peaks and valleys in the elements. Further, the elements are aligned when intertwined such that the twist valleys are located at element cross points and the twist peaks located between successive element cross points so that the elements nest with one another at the cross points. Additionally, the slope between the twist valley and peak form shoulders that restrain movement of the member elements. In one of several other forms of the invention, linear, elements are located at the members perimeter extending in the longitudinal direction of the cylindrical body of the first form in contact with the element cross points to further support the member. In yet another form, annular, radially extending elements are added to the first form to contact the element cross points at locations along the cylindrical body's length to provide added support to the member. In still another form, the linear element and the radial elements are added to the first form of the member. Finally, in yet another form, any of the various forms of the member is encased in a matrix of concrete or a polymeric material.

17 Claims, 4 Drawing Sheets

COMPOUND BUILDING MEMBER

FIELD OF INVENTION

This invention concerns a compounding member for use in building structures. The member features a plurality of elements at least some of which have a rotationally asymmetric closed plane cross section, the rotationally asymmetric elements being twisted about their longitudinal axis and intertwined such that at their cross points, the elements nest with one another to form a body having a closed plane curve cross section.

BACKGROUND OF THE INVENTION

The coming of the 21st Century will bring with it man's continuing settlement of frontiers in sea, sky and space first opened in the 20th Century. For this 21st Century colonization, new building strategies and techniques will be required to fabricate structures that will house, support and facilitate man and his activities. Because of the remoteness of these frontiers and the need for efficiency in performance and cost, the steel and concrete constructions that have characterized contemporary life in the past will no longer be suitable. Not only will the economics of transporting such conventional materials render them inappropriate for being carried into space, beneath the sea or even to sites on land for constructions ranging from space stations, to family dwellings, but also their bulk and awkwardness of handling will make them poor choices for the efficient and expansive structures contemplated for use in the 21st Century.

To this end, government and private sector engineers have undertaken joint programs to develop new and higher efficiency beam designs for use in building structures in these environments. Such efforts have placed particular emphasis on beam designs having low structural mass density and high geometrical stability over time. Further, these designs call for use of materials that can be cost effectively transported in bulk to remote construction cites, whether it be space, sea or earth, where they can be subsequently transformed into the beams and columns necessary to fabricate the desired structures.

More specifically, and as reported by T. J. Dunn, in NASA technical memorandum 58271, entitled *Geodetic Beam Development Test* published January 1986, workers at the National Aeronautics and Space Administration, in conjunction with private contractors developed a prototype geodetic beam of cylindrical open lattice form. In accordance with their design, the beam features an equilateral grid work of complimentary wound helical elements, further supported by multiple longitudinal elements, the multiple helical and longitudinal elements being bound by encapsulation placed at the respective cross points of the elements. While this construction as fashioned from wire made of a variety of materials such as aluminum and composites, showed some success, none the less, under loading tests, it exhibited failure points at the nodes where the wire elements crossed and were bonded to one another.

As reported, loading of the beams, particularly in compression, produced failure at the encapsulated cross points thus suggesting that regardless of the choice of wire element material and its dimensioning, the limiting factor for beam strength was node joint encapsulation. Further, and more fundamentally, in accordance with the NASA beam design, some form of bonding or encapsulation of the multiple wire elements was essential to beam integrity.

SUMMARY OF THE INVENTION

Accordingly, it is an object of this invention to provide a compound, i.e. multi-element, building member capable of being assembled into a wide range of structures.

It is another object of this invention to provide a multi-element building member having low mass density and geometric stability over time.

It is yet another object of this invention to provide a multi-element building member capable of being fabricated at the construction cite from high density material stored in bulk.

It is still another object of this invention to provide a multi-element building member having a strength less dependent on bonding of the multiple elements to one another than previously known designs.

It is still another object of this invention to provide a multi-element building member that does not require bonding of the multiple elements to one another.

Briefly, the building member in accordance with the invention achieves the above and other objects by including a plurality of elements that are intertwined to form a body having a closed plane curve cross section that extends in the member's longitudinal direction. Further, and in accordance with the invention, at least some of the elements of the member are formed with a rotationally asymmetric closed plane cross section and are helically wound about the longitudinal axis of the member. Still further, the rotationally asymmetric elements are twisted about their respective longitudinal axis so that the intertwined and twisted rotationally asymmetric elements nest with one another at their respective cross points.

In a first preferred form, the twisted elements of the member have a rectangular cross section and are intertwined to provide the member with a generally cylindrical body shape. In this arrangement, half the twisted rectangular elements are wound about the member's longitudinal axis in a first helical direction, while the other half of this twisted rectangular elements are wound about the member's longitudinal axis in a second helical direction that is opposite the first. Further, the twisted elements that are wound in opposite helical directions, are located at the member's perimeter, distributed in alternating fashion and angularly displaced so that the oppositely wound and twisted elements nest with each other at cross points distributed along the length of the member. Additionally, and in preferred form, the intertwined elements are twisted 180 degrees between respective cross points to constrain movement of the elements to the valley formed between the element peaks when the elements are twisted.

In second preferred form, the member of the first form, is additionally provided with linear elements located at the member's perimeter angularly displaced such that they contact the cross points of the helically wound and twisted elements as the linear elements extend over the length of the member. In this arrangement, the linear elements may take any convenient form, but preferably are also rectangular and twisted 180 degrees about their longitudinal axis between the contact points with the helically wound elements.

In the third preferred form, the member of the first described form, is provided with radially extending elements that conform with the cross section of the member. Here, the radially extending elements are distributed along that longitudinal axis of the member so as to contact the helically wound and twisted elements at their respective cross points. Here also, the added radial elements are twisted.

In a fourth preferred form, the first form of the member is provided with both linear elements and radially extending elements arranged as described in connections with the second and third preferred forms of the member above noted.

In still further preferred forms of the invention, any of the previously described first four preferred forms may have their multiple elements joined at the respective cross points. Finally, as yet further forms of the inventions, any of the members described can be embedded in a matrix of suitable material such as concrete or a polymeric substance.

BRIEF DESCRIPTION OF THE DRAWINGS

The above and other objects, features and advantages of the present invention will become apparent upon consideration of the following detailed description read with reference to the accompanying drawings in which.

DETAILED DESCRIPTION

As noted above, to enable building of the efficient structures anticipated for man's activities in space, under sea and on land in the remainder of this century and the beginning of the next, there is a need to develop stable, low mass density building members capable of being transformed at the building sites from readily transportable bulk material into beams, columns and other components needed for the desired constructions. A segment of a building member directed to these objectives and in accordance with this invention is shown in a first preferred forum in FIG. 1.

As seen there, member 1 is compound in that it includes a plurality of elements 4 to 14 that are intertwined to form a member body 2. More specifically, and with reference to FIGS. 2 and 3, body 2 of member 1 is seen to have a closed plane curve cross section formed by the intertwining of elements 4 to 14. As best seen in FIG. 3 where a thin segment of body 2 taken midway between element cross points; e.g., 16, 18, is presented, i.e; segment "B—B" in FIG. 1, element 4 to 14 are shown to be angularly distributed at the perimeter of body 2 so as to provide the body with a generally circular cross section.

Figure 1:
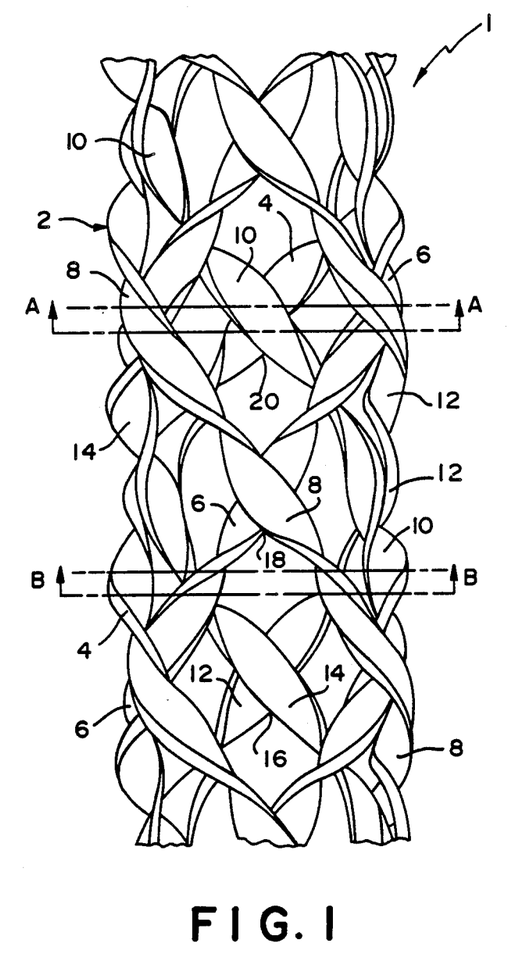
FIG. 1 is a plan view of a segment of a first form of the building member in accordance with the invention.

As shown in FIG. 1, in addition to being angularly distributed at the perimeter of body 2, elements 4 to 14 are also helically wound about the longitudinal axis of body 2. For this structure, half the element, i.e.; elements 6, 10 and 14 are wound in a first helical direction and the other half; i.e. elements 4, 8 and 12 are wound in a second helical direction that is opposite to the first.

With reference to FIGS. 1 and 3, and particularly, the left side of segment "B—B" in FIG. 1, elements 6 is seen to wind upwardly and then from left to right in the sense indicated by the arrow head shown in FIG. 3, as element 6 helically sweeps along the longitudinal axis of body 2 and across its upper quadrants 1 and then 2 in clockwise fashion. Continuing with reference to FIG. 1, the next element, i.e.; element 8, is seen to wind upwardly and then from right to left as indicated by the arrow head in FIG. 3, as element 8 helically sweeps along the longitudinal axis of body 2 and across its upper quadrants 1 and then 2 in a counter-clockwise fashion and opposite the direction of element 6.

Further, element 10 at the right side of segment "B—B" in FIG. 1, is seen to wind downwardly and then from right to left as noted by the arrow head in FIG. 3, as element 10 helically sweeps along the longitudinal axis of body 2 and across lower quadrants 3 and then 4 in a clockwise fashion, parallel to element 6. Next, element 12 is seen in FIG. 1 to wind upwardly and then from left to right as indicated by the arrow head in FIG. 3, as element 12 helically sweeps along the longitudinal axis of body 2 and across its lower quadrant 4 and then upper quadrant 1 in a counter-clockwise fashion parallel to element 8.

Continuing with reference to FIG. 1, and segment "B—B", element 14 is next, and is seen to wind upwardly and then from right to left as denoted by the arrow head in FIG. 3, as element 14 helically sweeps along the longitudinal axis of body 2 and across its lower quadrant 3 to upper quadrant 2 in clockwise fashion parallel to elements 6 and 10. Finally, element 4 at the left of segment "B—B" in FIG. 1 is seen to wind downwardly and then from left to right as indicated by the arrow head in FIG. 3, as element 4 helically sweeps along the longitudinal axis of body 2 and across its lower quadrants 4 then 3 in counter-clockwise fashion, parallel to elements 8 and 12, and opposite elements 6, 10 and 14.

Members 4 to 14 continue to sweep across body 2 in the described fashion until they reach the natural inflection point of their helical wrap, which lies some 180 degrees of travel about the longitudinal axis of body 2 as measured form the noted starting points for each of the respective elements. As will be appreciated by those skilled in the art, at the inflection points, elements 4 to 14 reverse their directions across body 2 as they continue to wind along the longitudinal axis of body 2. As elements 4 to 14 wind along the longitudinal axis of the body, elements 6, 10, 14, of the first group noted repeatedly cross the elements of the second group having the opposite helical direction, i.e., elements 4, 8, 12, so as to define the respective element cross points. Examples of element cross points are shown in FIG. 1 at 16, 18, 20.

Figure 2:
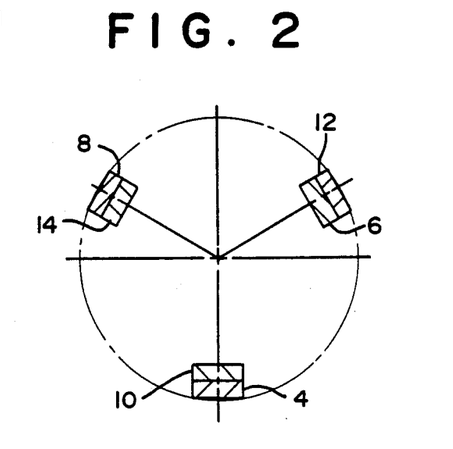
FIG. 2 is a cross-sectional view of a thin segment of a first form of the building member in accordance with the invention that has been taken at cross points of the member elements designed "A—A" in FIG. 1.
Figure 3:
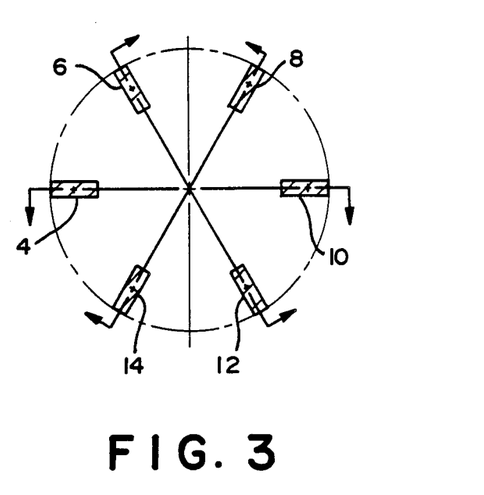
FIG. 3 is a cross-sectional view of a thin segment of a first form of the building member in accordance with the invention that has been taken midway between cross points of the member elements designed "B—B" in FIG. 1.

As seen in FIG. 2 which is a cross sectional view of thin segment "A—A" taken at element cross point 20 shown in FIG. 1, the elements of the second helical group; i.e., 4, 8, and 12, respectively, overlay elements 10, 14, and 6 of the first group. This results form the first group's elements in the illustrated example having been deployed before the elements of the second group. As will be appreciated by those skilled in the art, by virtue of the helical structure described, the first group of elements deployed will typically be overlaid by the elements of the second group deployed. However, in accordance with the invention, the various member elements may also be intertwined in alternating, over and under relationship at cross points with the elements of the companion group to produce a woven structure for body 2.

Figure 4:
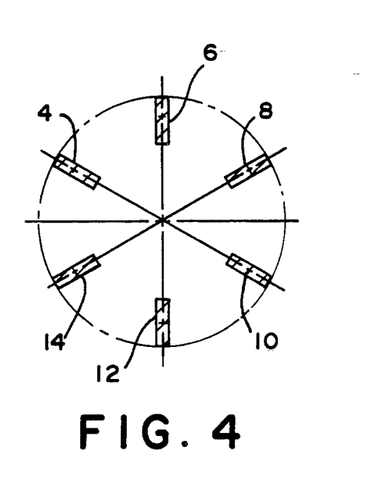
FIG. 4 is a cross-sectional view of a thin segment of the first form of the building member in accordance with the invention that has been rotated −30 degrees relative to the member segment shown in FIG. 3.
Figure 5:
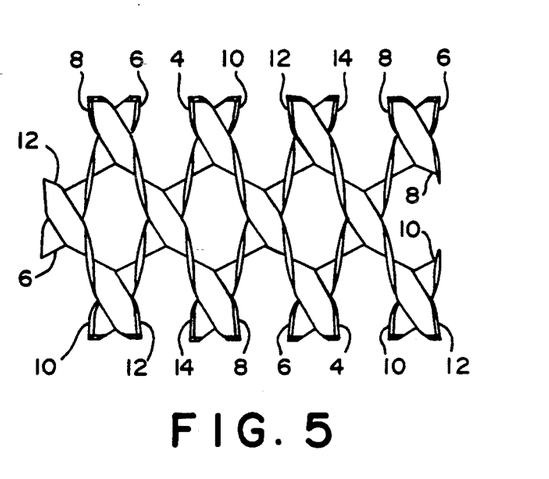
FIG. 5 is a longitudinal-sectional view of an extended segment of a first form of the building member shown in FIG. 4 in accordance with the invention.

With reference to FIG. 5, in which an extended longitudinal sectional view of the thin member segment shown in cross section in FIG. 4, is illustrated, the segment of FIG. 4 itself having been rotated −30 degrees about the longitudinal axis of body 2 relative to the segment shown in FIG. 3 for clarity, it can be seen that the elements of the first group; i.e., 6, 10, 14, are each crossed by each of the elements of the second group; i.e., 4, 8, and 12. Specifically, starting from the top right in FIG. 5, elements 6, 14 and 10 are each seen to be crossed by each of the elements 8, 12, and 4 of the second group at various points along the longitudinal axis of body 2 to produce the cylindrical lattice structure of body 2 illustrated in FIG. 1.

As will also be appreciated by those skilled in the art, the pitch of the member elements; i.e., the length along the longitudinal axis of body 2 the element extends for a given angular same for each of the member elements. Further, the pitch is preferably chosen such that the lattice structure created, as illustrated in FIG. 5, is equilateral; i.e., the distance between cross points is always the same, thus creating a geodetic member.

As noted above, while cylindrical, lattice type geodetic beam structures have been proposed previously, those designs required the lattice elements be bonded together at their cross points; as for example by encapsulation to achieve beam integrity. However, and as also noted, under test, those designs experienced failures due to ruptures of the element cross point bonds.

In accordance with this invention, and unlike the previous designs, I have found that the stability of element cross points can be improved without reliance on bonding or encapsulation, if the geometry of the member elements is properly selected. Particularly, I have found that if the member elements are provided with a rotationally asymmetrical closed plane cross section, the elements can be twisted so as to create peaks and valleys in the elements that permit the elements to nest with each other when the twist valleys are aligned at the element cross points.

In describing the twisted elements as having a rotationally asymmetrical cross section, I mean that for at least some rotation of the element about its longitudinal axis, corresponding points at the element perimeter before and after rotation will not be equidistant from the twist axis. For example, in the case of an element having a rectangular cross section, for a rotation of 90 degrees about its longitudinal axis, the elements width will be changed to its height. And, since the height of a rectangle is not equal to its width, following rotation, the elements cross sectional outline; i.e., its profile, will no longer be the same. Similarly, for an element having an elliptical cross section for a 90 degree rotation about its longitudinal axis, the elements major axis becomes its minor axis, again changing the elements profile. Still further, in the case of an element having a square cross section, for a rotation of 45 degrees, the elements diagonal becomes its height and width, and once more, the profile is changed.

By providing member elements with cross sections having the described rotational asymmetry, the elements can be twisted to change there profile in a fashion that creates the peaks and valleys above noted. Thereafter, the elements can be aligned when intertwined to form the member such that their cross points are located at the twist valleys, to thereby nest the elements within one another and restrict their relative movement. With the elements nested at the twist valleys, the slopes provided between the twist valleys and peaks act as shoulders; i.e., barriers to relative movement, which barriers when combined with the helical wrap of the elements holds the elements together under load.

Constraint of element movement in this fashion has several advantages. It not only, as noted, restricts relative movement to hold the elements together under load, but also, it allows for some relative movement between the elements to accommodate thermal expansion. In addition, the allowable relative movement of the elements at the cross points provides flexibility in the member, and the structures built with them, that serves to dissipate vibrational forces that may arise from; for example, earth quakes, or time varying forces caused by wind or wave action. As will be appreciated, the elements are free to move in the twist valleys and along the slopes between the valleys and peaks to the extent the available element longitudinal flexibility will allow.

In requiring element cross sectional asymmetry, for at least some designated angular rotation, it will be appreciated that rotation symmetry at points other than where the twist peaks is located is permitted. For example, at the 180 degree rotation point in the case of a rectangular or elliptical elements, and the 90, 180 and 270 degree rotation points of square elements, the profile before rotation and again after rotation is the same.

This duplication of profile upon some specific amounts of rotation less than 360 degrees merely permits the elements to be twisted a corresponding amount less than 360 degree that is sufficient to form a peak in the element, and, thereafter, continue the twist to return it the twist valley; i.e., the profile prior to the rotation. Otherwise if the element cross section is selected to have no rotational symmetry in less than a full turn, the elements would be required to be twisted 360 degrees between cross points.

As will be appreciated, it follows from the above that for the definition of asymmetry given, elements having a circular cross section would be excluded from selection. Since an element having a circular cross section exhibits no change in profile under rotation; i.e., twist, about its longitudinal axis, it would not be suitable for creating the noted peaks and valleys required to constrain element movement.

As seen in FIGS. 1 to 5, in the first preferred form of the invention, elements 4 to 14 are rectangular and are twisted 180 degrees between element cross points. This twist pitch has the effect of creating a single peak located approximately midway between successive cross points, the single peak being located approximately 90 degrees in element rotation form either cross point. As will be appreciated, the twisting of the element in preferred form begins just after the region over which the elements nest at a first cross point, proceeds at constant twist pitch to the point of the peak, and continues, thereafter, at constant twist pitch until the beginning of the region where the elements again nest at a second cross point. Accordingly, in determining the points along the length of the elements at which twist starts and stops, account should be taken for the width of the elements seated, at the cross points.

In addition, I select the asymmetry of the element cross section and the shape of the shoulders formed by the slopes that lead from the twist valleys to the peaks such that the slope of the shoulder and the height of the peak can be adjusted to vary the allowable movement of the nested elements depending on the application. Particularly, the degree of movement at the twist valley may be varied by making the twist slope steeper and/or making the twist pitch variable between element cross points. As will be appreciated, however, the range of available steepness of the twist slope; i.e., twist pitch, will be dependent on the element material twist characteristics, and its dimensioning; e.g., width and thickness.

Continuing, as seen in FIGS. 1 to 5, I prefer to use six member elements equally spaced about the perimeter of member 1 to define body 2. Accordingly, the elements are spaced approximately 60 degrees apart. As will be appreciated by those skilled in the art, the specific number of elements to be used in forming the member, which may be any integer multiple of two to accommodate the complementary helical wrap; the cross sectional asymmetry for the elements; the dimensioning of the respective elements; their twist pitch; and material composition; as well as other parameters of a specific member depend on the dimensioning of the member to be fabricated and the particular application it will be used in. In this regard, it will also be understood that the cross sectional dimensions of the individual helical elements may be varied along the length of the member so that the members has a non-uniform cross section along its length provided the members are capable of nesting in accordance with the teaching of the invention.

Figure 6:
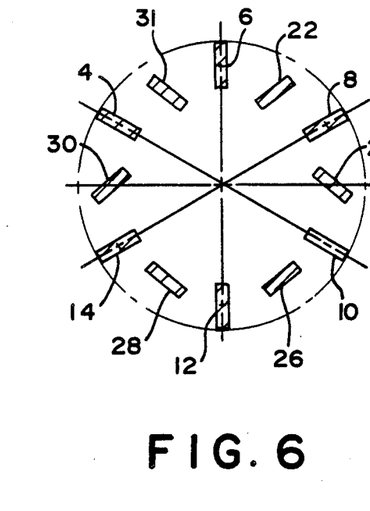
FIG. 6 is a cross-sectional view of a thin segment of a second form of the building member in accordance with the invention taken midway between cross points of the member elements.
Figure 7:
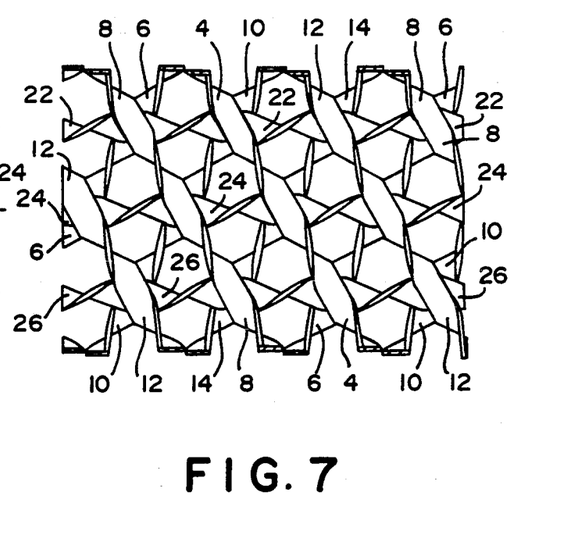
FIG. 7 is a longitudinal-sectional view of an extended segment of a second form of the building member shown in FIG. 6 in accordance with the invention.

In addition to the first form of the invention shown in FIGS. 1 to 5, body 2 may be modified to provide additional preferred forms of member 1. Specifically, in FIGS. 6 and 7, where like elements are designated in like manner, member 1 presented in FIGS. 1 to 5 has been adjusted to provide a second preferred form. As shown, linear elements 22 to 30 have been added to helically wound elements 4 to 14. With reference to FIGS. 6 and 7, linear elements 22 to 30 extend in the longitudinal direction of body 2 and are angularly distributed at the perimeter of body 2 such that they contact helically wound elements 4 to 14 at their respective cross points, as best seen in FIG. 7, and, are located midway between the helically wound elements at the points along the length of body 2 where the helically wound elements have been twisted to form the twist peaks, as best seen in FIG. 6.

In accordance with the invention, linear elements 22 to 30 may have any convenient cross section, however, in the preferred form shown in FIGS. 6 and 7, elements 22 to 31 are of like form with helically wound elements 4 to 14; i.e., rectangular and twisted about their longitudinal axis such they also nest at the cross point with elements 4 to 14. In this arrangement, the linear elements may be sandwiched between the helically wound elements as they nest at the cross points as shown or alternately woven in over and under fashion between successive cross points in order to be held in place.

As will be appreciated, the widths and thicknesses of the all respective elements; i.e., linear and helically wrapped, are selected so that the peaks and associated shoulders formed when the elements are twisted will be sufficient to constrain movement of the nested elements in the manner discussed in connection with the description of the first preferred form of member 1. In addition, the number of linear elements may be varied to correspond to the number of helically wound elements, whose number may vary as noted above depending on the particular application for the member.

Figures 8, 9:
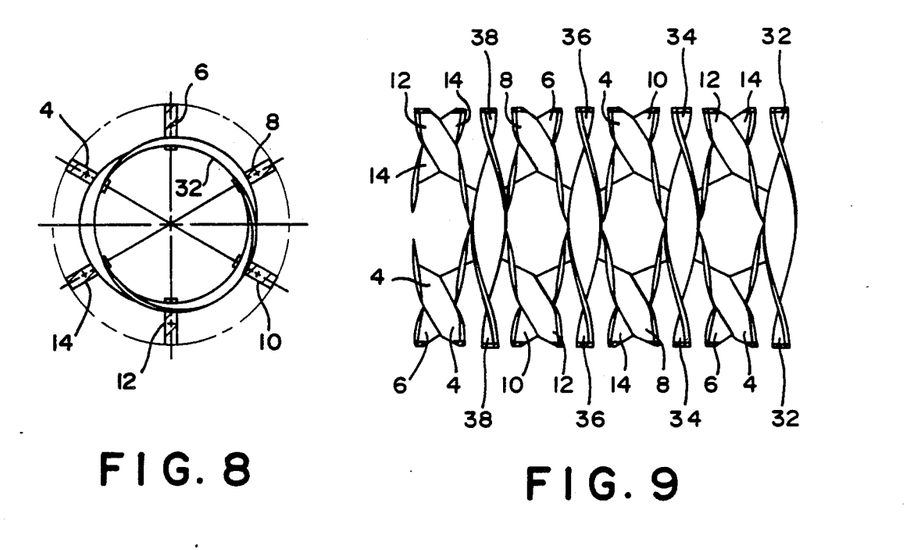
FIG. 8 is a cross-sectional view of a thin segment of a third form of the building member at a rib element in accordance with the invention.
FIG. 9 is a longitudinal-sectional view of an extended segment of a third form of the building member shown in FIG. 8 in accordance with the invention.

Continuing, in FIGS. 8 and 9, where again like elements are designated in like manner, member 1 shown in FIGS. 1 to 5 has again been adjusted to produce a third preferred form of the invention. Specifically, annular, radially extending elements, illustrated at 32 to 38, have been added to helically wound elements 4 to 14. As shown in FIGS. 8 and 9, elements 32 to 38 extend in the radial direction of body 2 as best seen in FIG. 8, and are distributed along the longitudinal length of body 2 so as to contact the helically wound elements at their respective cross points as best seen in FIG. 9. Here again, the additional elements; i.e., annular, radial elements 32 to 38, may take any suitable form, but, as shown, are twisted to again nest at the cross points with helically wound elements 4 to 14. Here also, the width of the respective elements is selected to assure that the respective twist peaks and shoulders are adequate to constrain relative movement of the elements in the manner described above. Further, elements 32 to 38 may be radially dimensioned to contact the helically wound elements at the radially interior face of the cross points to act as a support rib, or to contact the helically wound elements at the radial exterior face of the cross points to act as a restraining band depending on the specific application intended for member 1. Here also, dimensioning and frequency of placement along the length of member 1 will dependent upon the particular application of member 1.

Figure 10:
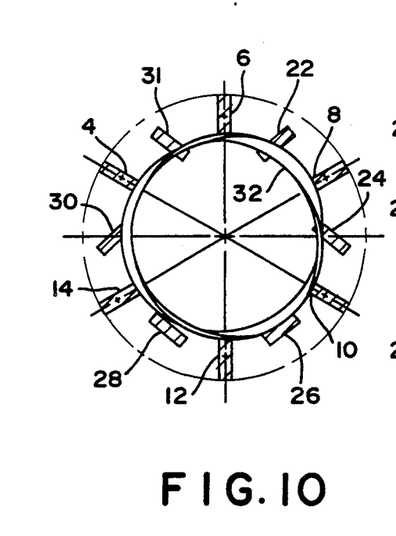
FIG. 10 is a cross-sectional view of a thin segment of a third form of the building member at a rib element in accordance with the invention.
Figure 11:
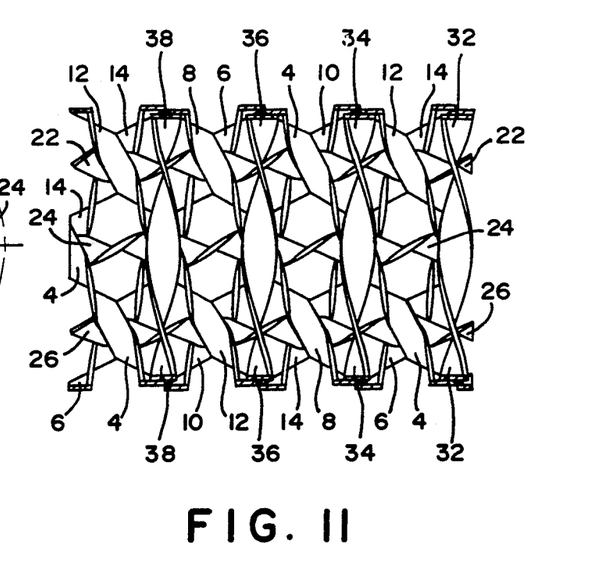
FIG. 11 is a longitudinal-sectional view of an extended segment of a third form of the building member shown in FIG. 10 in accordance with the invention.

Still further, in FIGS. 10 and 11 where again like elements are designated in like manner, member 1 shown in FIGS. 1 to 5 has been adjusted to produce a fourth preferred form of the invention. In the fourth form, both the linear elements 22 to 31 and the radial elements 32 to 38 of, respectively, the second and third preferred forms of the invention are combined with helically wound elements 4 to 14 of the first described embodiment. In this arrangement, the elements would be configured as described in connection with the first, second and third preferred embodiments as above discussed. And, as noted, dimensioning of the elements; e.g., the height of the element twist peaks and the shape of the respective associated shoulders, are selected to restrain relative movement of the elements as desired and within the limits of the materials selected for the elements.

Figures 12, 13:
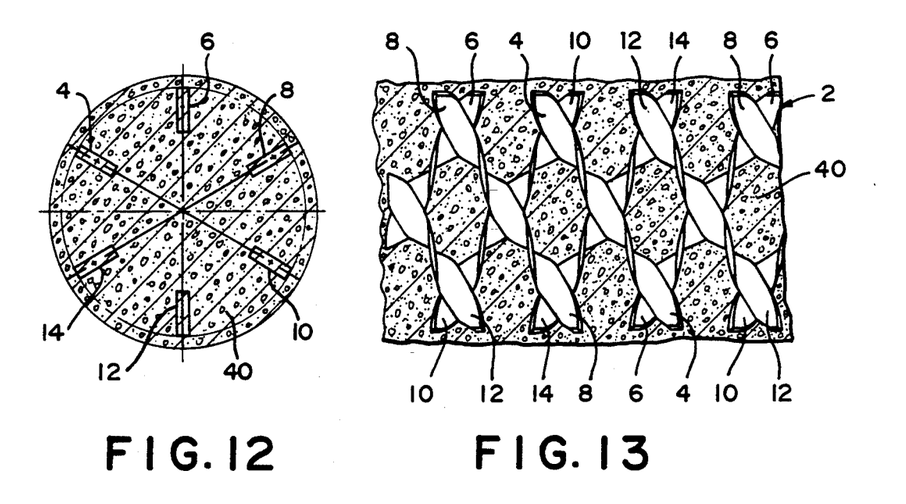
FIG. 12 is a cross-sectional view of a thin segment of a fourth form of the building member in accordance with the invention taken midway between cross points of the member elements.
FIG. 13 is a fragmented longitudinal view of an extended segment of a fourth form of the building member shown in FIG. 12 in accordance with the invention.

Continuing, a still further form of the invention is presented in FIGS. 12 and 13. In FIGS. 12 and 13, a fifth preferred form of the invention is shown in which the member of any of the first four preferred forms of the invention, shown as body 2 of the first form for purposes of illustration, has been encased in a matrix 40 such as concrete to act as a reinforcement for the concrete. In this form, while relative movement of the elements at the cross points is further restricted by the matrix, the twist of the elements enhances the adherence of the concrete to body 2, while body 2 disrupts force patterns within the member when loaded to thereby enhance the strength of the member. As will be also be appreciated, any suitable material could be used as matrix 40; as for example, as an alternative to concrete, a polymeric materials commonly used for making structural elements such as epoxy, polyamide or the like could be used.

While, as noted above, selection of the member elements with the described cross sectional asymmetry, twisted and wound in the manner described, provides a stable member whose cross points need not be joined, where additional rigidity of the structure is desired, joining of the elements at the cross points may be undertaken in any of the preferred form of body 2 described. As will be appreciated, joining of the elements may be accomplished in any suitable fashion; as for example, by bonding or encapsulation well known in the art.

Figures 14, 15:
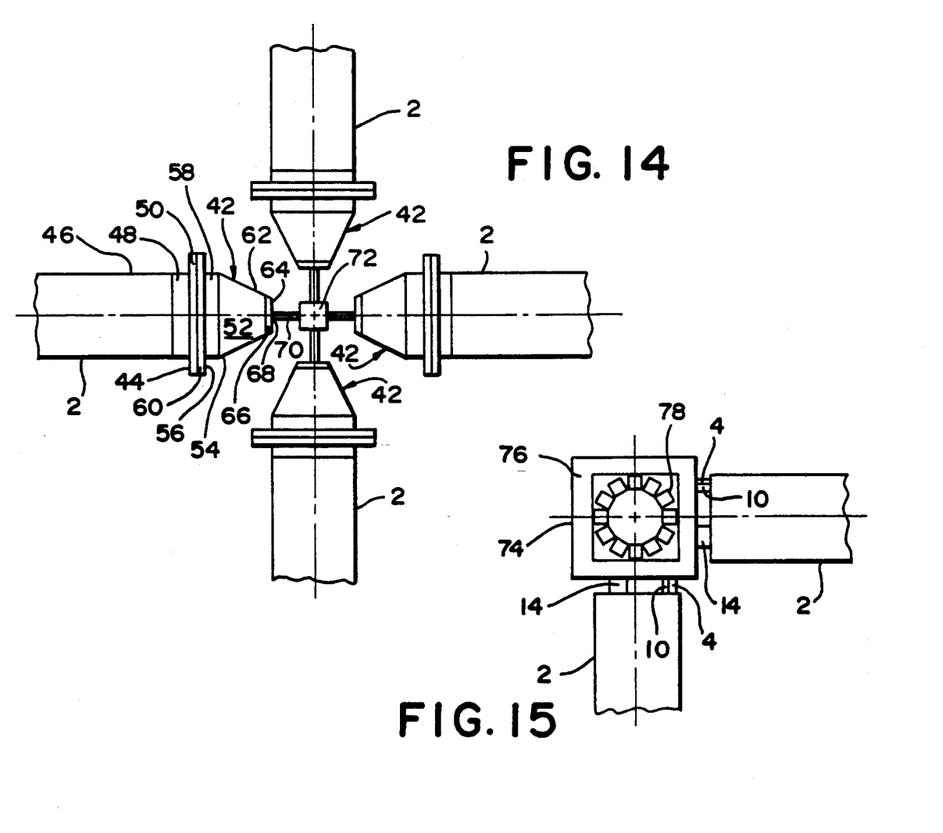
FIG. 14 is a front elevation view of a joint of multiple building member provided with coupling cone assemblies in accordance with the invention.
FIG. 15 is a front elevation view of a joint of multiple building member together with a junction member assembly in accordance with the invention.

To facilitate connection of the member 1 to other members of the same form or any of the various described preferred forms, in accordance with the invention, a coupling cone assembly 42 illustrated in FIG. 14 may be used. As seen in FIG. 14, the coupling assemblies 42 are alike and include a member coupling ring 44 attached at end 46 of member 1. Ring 44 features a collar 48 that may be attached in conventional fashion; e.g., by welding or bonding, to body 2 at member end 46. Further, ring 44 includes a flange 50 either integrally formed with the collar of attached thereto in any suitable manner that is disposed orthogonally to the longitudinal axis of body 2.

Further, assembly 42 includes a cone body 52 of construction corresponding to that of member 1. As will be appreciated, cone body 52 need not be identical in form or element dimensioning to member body 2, as long as it meets the strength requirements of the particular application. Additionally, at first end 54, cone body 52 includes a coupling ring 56 having a cone collar 58 joined to cone body 52 in any suitable fashion, and a flange 60 disposed orthogonally to the cone longitudinal axis and connected to or made a part of collar 58, for coupling the cone and member together. As will be appreciated, the mating flanges of the member ring and cone ring may be joined in any suitable manner; e.g., bolting, welding, bonding, etc.

Still further, cone body 52 is provided with an attachment plate 64 and companion collar 66 at cone end 62, orthogonally disposed to the axis of cone body 52 and again bonded to it in any suitable manner. Attachment plate 64 is provided with a bore 68 20 disposed orthogonally to the plate's cross section for receiving an attachment shaft 70 extending orthogonally from a coupling block 72 having other attachment shafts extending therefrom that attach to other cone assemblies and members. Shaft 70 may be mounted in block 72 in any suitable manner and arranged at any angle required for the coupling or mounting of the members. Shaft 70 may be attached to cone plate 64 in any suitable manner; e.g., by threaded nut, pin etc. As will also be appreciated block 72 may be configured in a variety of forms; e.g., solid, multiple plates, sphere, etc.

As an alternative coupling scheme, multiple member 1 may be joined together or otherwise mounted by means of a junction member 74 shown in FIG. 15. As seen in FIG. 15, member 74 may be in the form of cube having six congruent faces 76, each with a universal hole pattern 78 for receiving the cross point ends of helical elements 4 to 14 shown in FIG. 2. With this arrangement, members 1 can be orthogonally coupled to one another by plugging the member body ends into hole pattern 78 of the junction member and fixing the members in place in any suitable manner; e.g., by welding, bonding, etc. As will be appreciated hole pattern 82 may be adjusted to accommodate the various forms of the invention described, or simply made to receive the member cross section. In addition, member 78 may be provided in other shapes to accommodate joining the members at other than orthogonal angles.

While I have described my invention in preferred form, it will be appreciated by those skilled in the art that various changes in form, construction and arrangements of its elements may be made without departing from the spirit or scope of the invention.

What I claim is:

1. A building member for use in fabricating structures, the member comprising a plurality of elements that are intertwined to form a body having a closed plane curve cross section that extends in the longitudinal direction of the member, at least some of the plurality of elements having a rotationally, asymmetric closed plane cross section, at least some of the elements having the rotationally asymmetric cross section being twisted about their longitudinal axis so that the intertwined and twisted rotationally asymmetric elements next with one another at their respective cross points and are restrained against movement thereby.

2. The building member of claim 1 wherein the twisted rotationally asymmetric elements are intertwined such that they form a generally cylindrical body for the member.

3. The building member of claim 2 wherein at least some of the twisted rotationally asymmetric elements are wound in a first helical direction and wherein at least some of the twisted rotationally asymmetric elements are wound in a second helical direction.

4. The building member of claim 3 wherein the second helical direction that some of the rotationally asymmetric elements are wound in is opposite the first helical direction that some of the rotationally asymmetric polygonal elements are wound in.

5. The building member of claim 4 wherein the member is imbedded in a matrix.

6. The building member of claim 5 wherein the matrix is concrete.

7. The building member of claim 5 wherein the matrix is a polymeric material.

8. The building member of claim 4 wherein the twisted rotationally asymmetric elements have a rectangular cross section.

9. The building member of claim 8 wherein the helically wound elements are joined at their respective cross points.

10. The building member of claim 8 wherein the twisted rotationally asymmetric elements are twisted at least 180 degrees about their longitudinal axis between nested cross points of the elements.

11. The building member of claim 10 wherein at least some of the member elements are linear and extend in the longitudinal direction of the member.

12. The building member of claim 11 wherein the linear elements are twisted about their longitudinal axis and nest at cross points with the helically wound elements.

13. The building member of claim 10 wherein at least some of the member elements are circular and extend in the radial direction of the member.

14. The building member of claim 13 wherein the radial elements are distributed in the longitudinal direction of the member such that the radial elements engage the cross points of the helically wound elements.

15. The building member of claim 10 wherein at least some of the member elements are linear and extend in the longitudinal direction of the member, and at least some of the elements are circular and extend in the radial direction of the member.

16. The building member of claim 15 wherein the radial elements are distributed in the longitudinal direction of the member such that the radial elements engage the cross points of the helically wound elements and the linear elements.

17. A building member for use in fabricating structures, the member comprising a plurality of elements, at least some of which have a rotationally asymmetric closed plane cross section, the rotationally asymmetric closed plane cross sectional elements being twisted about their longitudinal axis, the plurality of elements being intertwined such that they form a generally cylindrical body for the member and so that the twisted rotationally asymmetrical elements next with one another at their cross points and are restrained against movement thereby, the rotationally asymmetrical elements being twisted at least 180 degrees between cross points.

* * * * *